United States Patent
Sun

(10) Patent No.: US 8,055,131 B2
(45) Date of Patent: Nov. 8, 2011

(54) ROUTE QUERY METHOD IN ASON

(75) Inventor: Desheng Sun, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 477 days.

(21) Appl. No.: 12/443,123

(22) PCT Filed: Sep. 29, 2006

(86) PCT No.: PCT/CN2006/002581
§ 371 (c)(1),
(2), (4) Date: Mar. 26, 2009

(87) PCT Pub. No.: WO2008/037124
PCT Pub. Date: Apr. 3, 2008

(65) Prior Publication Data
US 2010/0086299 A1    Apr. 8, 2010

(51) Int. Cl.
*H04J 14/00* (2006.01)
*H04L 12/66* (2006.01)

(52) U.S. Cl. .............................. 398/45; 398/57; 370/355

(58) Field of Classification Search .................... 398/45, 398/55, 57; 370/355
See application file for complete search history.

(56) References Cited

FOREIGN PATENT DOCUMENTS
CN    1764323    4/2006
EP    1545079    6/2005

OTHER PUBLICATIONS

English language abstract of European Patent No. EP 1545079, http://ep.espacenet.com, downloaded Mar. 24, 2009.
English language abstract of Chinese Patent No. CN 1764323, http://ep.espacenet.com, downloaded Mar. 24, 2009.
Chen, Yunzhi, "Signalling and Routing for the Automatically Switched Optical Network," Photonic Bridges (China) Ltd. Co., Beijing 100004, with English language abstract, Aug. 12, 2002.
Li, Yong, "Analysis of the Working Mechanism of Routing on ASON," Fiberhome Technologies College of WuHan Research Institute of Post and Telecommunication, Wuhan, with English language abstract, Feb. 12, 2004.

*Primary Examiner* — Jack Dinh
(74) *Attorney, Agent, or Firm* — DASCENZO Intellectual Property Law, P.C.

(57) ABSTRACT

A route inquiry method in ASON for implementing the route inquiry by the network element NE1 which has a protocol controller (PC) and a connection controller (CC) but without a route controller (RC) or routing database (RDB) having no enough information includes: NE1 sends a protocol message of Route Request to the remote NE2, then the NE2 obtains the route result according to the Route Request, and returns the result to NE1 which launches the Route Request by protocol message of Route Response; the PC of NE1 sends the route result to the CC of local network element after receiving the Route Response protocol message.

10 Claims, 3 Drawing Sheets

ROUTE QUERY METHOD IN ASON

TECHNICAL FIELD

The present invention relates to the field of optical networks, and more specifically to a route inquiry method in an automatic switched optical network.

TECHNICAL BACKGROUND

Optical networks, such as OTN (Optical transmission network), WDM (Wavelength-division multiplexing), SDH (Synchronous digital hierarchy) or SONET (Synchronous optical network) have been widely applied in the telecommunication field.

Recently, the automatic switched optical network (ASON) is one of research hotspots in the field of optical networks. The concept of ASON is offered by ITU-T G.8080, and the function of ASON is achieved through a specific Control Plane (CP). ITU-T G.7713 specifies the framework to implement distributed calls and connections in ASON and offers the implementation criterion for automatically establishing, modifying and deleting the calls and connections. Standards such as ITU-T G.7715 offer the implementation model and method for the route inquiry of connection (the route inquiry described in the following refers to the route inquiry of connections, unless especially declared).

However, the published ITU-T G.7715 and ITU-T G.7715.1 apply the model shown in FIG. 1. In this route model, when a certain network element (NE) in ASON needs to query the route of connection, the Connection Controller (CC) which is responsible for the connection control (including establishment, deletion, modification, and so on) sends the Route Request to the Route Controller (RC) which is responsible for route inquiry and calculation, and then the RC calls a route algorithm (a typical route algorithm is Constrained Shortest Path First, shortly CSPF) according to the Route Request and calculates the route based on the routing database (RDB) of the node and returns the route calculation result (Route Response for short) to the CC.

However, the RDB of a node is generally hard to have the complete route information of the whole ASON, thus the model shown in FIG. 1 can not meet the requirements of route inquiry and calculation. Therefore, the model shown in FIG. 2 is offered in the related technology in recent years, and the model is derived from the model shown in FIG. 1, that is, when the CC of a certain NE in the ASON launches a Route Request of a connection to the RC, the RC will call CSPF according to the Request and implement the route calculation based on the RDB of the node. If the related route can not be found, the local RC will transmit the Route Request to another related ASON NE having a more complete RDB through protocol control component (PC for short). The RC of the other related NE calls CSPF after it receives the Route Request through PC and completes the route calculation based on the RDB of the node, and returns the Route Response to the ASON NE which launches the Request. This ASON NE will return the Route Response to its CC.

ITU-T G.8080 suggests that the CP in ASON should apply a flexible framework, that is, any ASON NE may lack a certain component, e.g., RC. Therefore, if a ASON NE without RC which needs to query the route, the route inquiry can not be implemented by either the method shown in FIG. 1 or the one shown in FIG. 2.

SUMMARY OF THE INVENTION

The present invention resolves the technical problem by offering a method for route inquiry in ASON to resolve the route inquiry problem when an ASON NE is lack of RC.

The present invention offers a method for route inquiry in ASON to realize the route inquiry when a NE has PC and CC but not RC, and the method includes the following steps:

(1) when a CC of a NE1 without RC needs to query a route, the NE1 sends a protocol message of Route Request to a remote NE2;

(2) when the NE2 obtains the route result according to the Route Request, the NE2 returns the route result to the NE1 who launches the Route Request by sending a protocol message of Route Response;

(3) the PC of the NE1 returns the route result to the CC of the NE1 after it receives the protocol message of Route Response.

Furthermore, said step (1) includes:
when the CC of the NE1 determines that it needs to query the route, the CC constructs the protocol message of Route Request;
the PC of the NE1 sends the protocol message of Route Request to the remote NE2.

Furthermore, if the remote NE2 includes RC, PC and RDB having complete routing information of the ASON, the step (2) includes:
the PC of the NE2 forwards the protocol message of Route Request to the RC of the NE2 after it receives the protocol message of Route Request;
according to the Route Request, the RC of the NE2 calls a route algorithm, calculates the route based on the RDB of the NE2 and constructs the protocol message of Route Response;
the PC of NE2 returns the protocol message of Route Response to the NE1 which launches the Route Request.

Furthermore, the step (2) further includes:
if the RC of the NE2 determines that the routing is failed and the requested route information is not found after it calculates the route, the RC constructs a protocol message of Route Request according to the original Route Request and sends the protocol message to a remote NE3 with RC, PC and complete RDB through the PC of the NE2;
the PC of the NE3 forwards the protocol message of Route Request to the RC of the NE3 after it receives the protocol message;
according to the received Route Request, the RC of the NE3 calls a route algorithm and calculates the route based on the RDB of the NE3, and constructs a protocol message of Route Response after successfully calculating the route;
the protocol message of Route Response is returned to the NE2 and then to the NE1 by the PC of the NE3 until the CC of the NE1 receives the protocol message of Route Response.

Furthermore, if the remote NE2 has RC, PC, CC and RDB having complete routing information of the ASON, then step (2) includes:
the PC of the NE2 forwards the protocol message of Route Request to the CC of the NE2 after it receives the protocol message;
according to the Route Request, the CC of the NE2 sends the Route Request of NE2 to the RC of the NE2;
according to the Route Request sent from the CC of NE2, the RC of the NE2 calls a route algorithm, calculates the route based on the RDB of the NE2 and returns the route result to the CC of the NE2;
According to the received route result, the CC of the NE2 constructs a protocol message of Route Response, and returns the protocol message to the NE1 who launches the Route Request through the PC of the NE2.

Furthermore, the step (2) further includes:
if the RC of the NE2 determines that the routing is failed and the requested route information is not found after it calculates the route, the RC constructs a protocol message of Route Request according to the original Route Request and sends the protocol message to the remote NE3 having RC, PC and complete RDB through the PC of the NE2;

the PC of the NE3 forwards the protocol message of Route Request to the RC of the NE3 after it receives the protocol message;

according to the received Route Request, the RC of the NE3 calls a route algorithm, calculates the route based on the RDB of the NE3 and constructs a protocol message of Route Response after successfully calculating the route;

The PC of the NE3 returns the protocol message of Route Response to the NE2, and the CC of the NE2 reconstructs the protocol message of Route Response according to the calculation result, and sends it to the NE1 until the CC of the NE1 receives the route calculation result.

Furthermore, the above route algorithm is CSPF.

The method of the present invention enables the route inquiry of a NE having no RC by interacting with other remote NEs through protocol message, and is compatible with the prior art, easy and reliable.

PREFERRED EMBODIMENT OF THE INVENTION

The present invention will now be described in further detail with reference to accompanying figures and preferred embodiments.

Based on the prior art, the present invention offers an implementation strategy to solve the problem that route inquiry can not be performed by a NE having no RC in ASON. The key of the present invention is to implement route inquiry by a CC of a NE in ASON collaborating with a remote NE, which is characterized in that when an ASON NE having no RC needs to query a route, the CC of the NE sends a Route Request to a remote ASON NE through a protocol message (such as Open Shortest Path First, OSPF-TE for short; Resource Reservation Protocol, RSVP-TE for short); after the CC or RC of the remote ASON NE receives the Request, the remote ASON NE calculates the route through its node; then the route result is returned to the NE who launches the Request.

Figure 1:
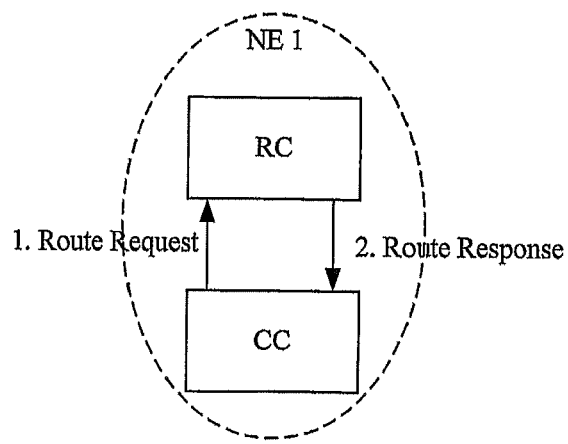
FIG. 1 is an illustration of implementing route inquiry of a signal NE in an ASON according to the prior art.
Figure 2:
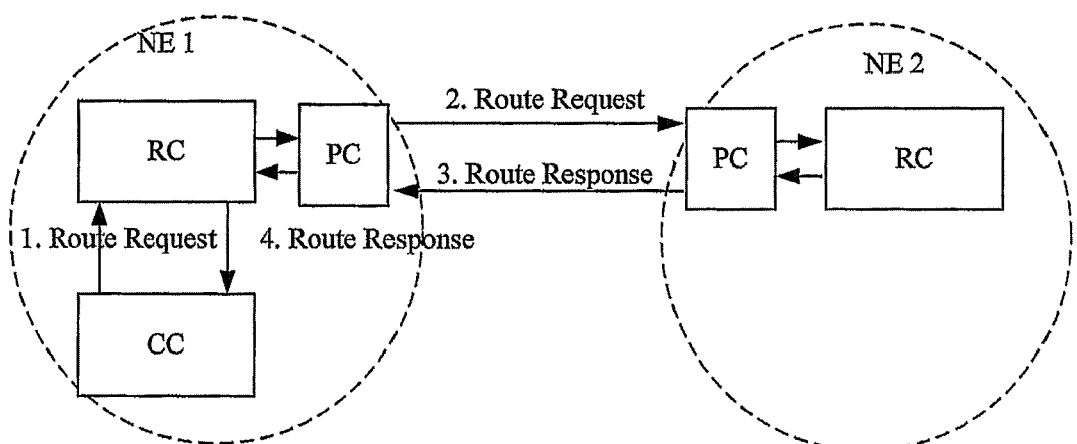
FIG. 2 is an illustration of implementing route inquiry by a single NE having no complete RDB through collaborating with other remote NEs in an ASON.
Figure 3:
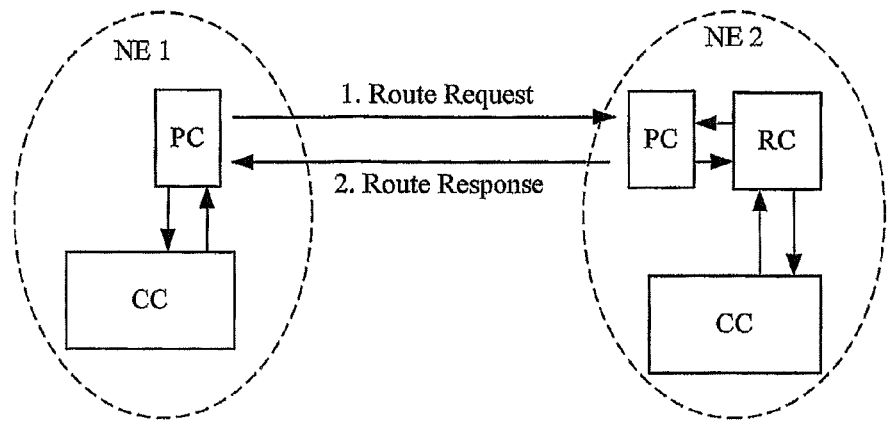
FIG. 3 is an illustration of implementing route inquiry by a NE in an ASON having no RC through CC-RC collaboration with a remote NE in the ASON.
Figure 4:
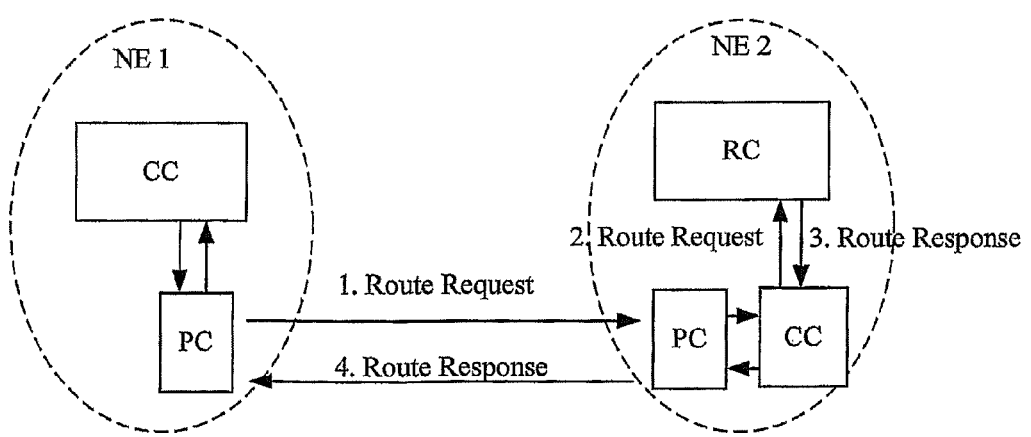
FIG. 4 is an illustration of implementing route inquiry by a NE in an ASON having no RC through CC-CC collaboration with a remote NE in the ASON.
Figure 5:
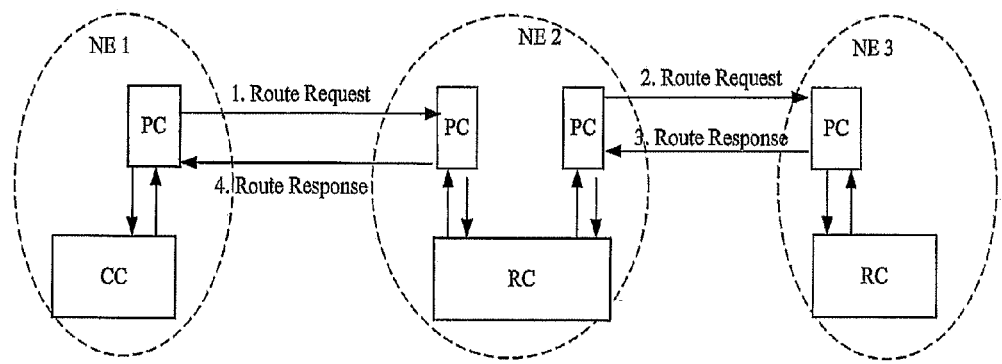
FIG. 5 is an illustration of implementing route inquiry by a NE in an ASON having no RC through collaborating with several remote NEs in the ASON, based on FIG. 3.
Figure 6:
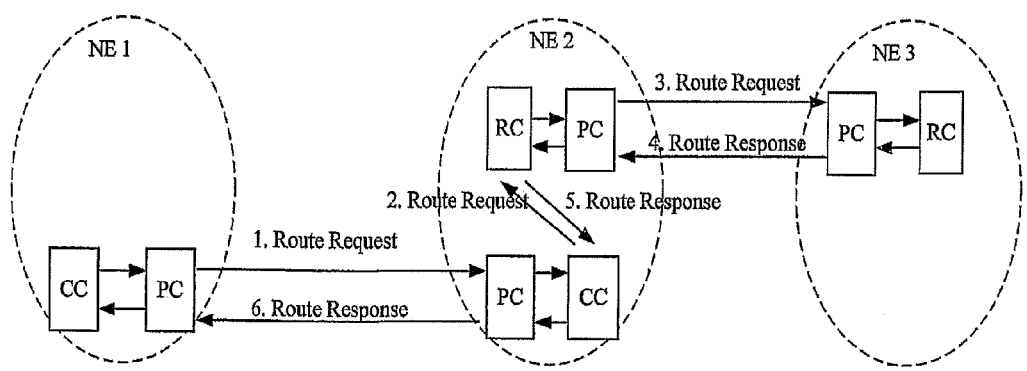
FIG. 6 is an illustration of implementing route inquiry by a NE in an ASON having no RC through collaborating with several remote NEs in the ASON, based on FIG. 4.

FIG. 1 is an illustration that a single ASON NE implements route inquiry through the interaction with the local CC and PC in the background part; FIG. 2 is an illustration of implementing route inquiry by a single NE having no complete RDB through collaborating with a remote NE in the ASON; FIG. 3 is an illustration of implementing the function of route inquiry by the RC of the remote ASON NE through direct interaction between the local CC and the RC of the remote ASON NE; FIG. 4 is an illustration of implementing route inquiry by a NE in an ASON having no RC through the interaction between the local CC and the CC of a remote ASON NE using the RC of the remote ASON NE; FIG. 5 is an illustration of implementing route inquiry further extended from FIG. 3; FIG. 6 is an illustration of implementing the route inquiry further extended on the basis of FIG. 4.

The first embodiment of the method of the present invention will be described-below with reference to FIG. 1, FIG. 2 and FIG. 3, taking the NE1 and the NE2 in FIG. 3 as an example, wherein the NE1 has no RC and needs to implement the function of route query.

The first embodiment includes the following steps:

In step 301, the CC of the NE1 in FIG. 3 determines whether to query the route, if yes, proceeds to the next step; otherwise, it continues to detect and determine;

In step 302, the CC of the NE1 constructs a protocol message of Route Request and sends the protocol message of Route Request to the NE2 through the PC of the NE1;

In step 303, the PC of the NE2 receives the protocol message of Route Request from the NE1 and forwards it to the RC of the NE2;

In step 304, the RC of the NE2 calls CSPF according to the received Route Request and performs route calculation based on the RDB of the NE2;

In step 305, the RC of the NE2 constructs a protocol message of Route Response according to the route result and sends the protocol message carrying the route result to the NE1 through the PC of the NE2;

In step 306, after the PC of the NE1 receives the protocol message of Route Response, it sends the related route result to the CC of the NE1.

The second embodiment of the method of the present invention will be described-below with reference to FIG. 1, FIG. 2 and FIG. 4, taking the NE1 and the NE2 shown in FIG. 4 as an example, wherein the NE1 has no RC and needs to implement the function of route query.

The second embodiment includes the following steps:

In step 401, the CC of the NE1 shown in FIG. 4 determines whether to query the route, if yes, proceeds to the next step;

In step 402, the CC of the NE1 constructs a protocol message of Route Request and sends the protocol message of Route Request to the NE2 through the local PC;

In step 403, the PC of the NE2 receives the protocol message of Route Request from the NE1 and forwards the protocol message to the CC of the NE2;

In step 404, according to the received protocol message, the CC of the NE2 sends the Route Request of the NE 1 to the RC of the NE2, and the RC calls a route algorithm and performs the route calculation based on the RDB of the NE2;

In step 405, the RC of the NE2 returns the routing result to the CC of the NE2, who constructs a protocol message of Route Response according to the route result and sends the protocol message of Route Response carrying the routing result to the NE1 through the local PC;

In step 406, after the PC of the NE1 receives the Route Response, it sends the related route result to the CC of the NE1.

The third embodiment of the method of the present invention will be described-below with reference to FIG. 1, FIG. 2, FIG. 3 and FIG. 5, taking the NE1, the NE2 and the NE3 shown in FIG. 5 as an example, wherein the NE1 has no RC, the NE2 has no complete RDB, and the NE1 needs to query the route.

The third embodiment includes the following steps:

In step 501, the CC of the NE1 shown in FIG. 5 determines whether to query the route, if yes, proceeds to the next step;

In step 502, the CC of the NE1 constructs a protocol message of Route Request and sends the protocol message to the NE2 through the local PC;

In step 503, the PC of the NE2 receives the protocol message of Route Request from the NE1 and forwards the protocol message to the RC of the NE2;

In step 504, the RC of the NE2 calls a route algorithm CSPF according to the received Route Request and performs the route calculation based on the RDB of the NE2;

In step 505, the RC of the NE2 checks the route result and if the result is that the route query fails and the failure reason is that the RDB of the NE2 is not complete, the RC reconstructs a protocol message of Route Request and sends the protocol message to the NE3 through the PC;

In step 506, the PC of the NE3 receives the protocol message of Route Request and forwards the protocol message to the RC of the NE3;

In step 507, the RC of the NE3 calls a route algorithm according to the received Route Request and performs route calculation based on the RDB of the NE3;

In step 508, the RC of the NE3 checks the route result and if the result is that the route inquiry is successful, it constructs a signal of Route Response according to the route result and sends the protocol message of Route Response carrying the route result to the NE2 through the PC, and finally, the protocol message of Route Response is sent to the NE1 who initially launches the Route Request through the NE2;

In step 509, after the PC of the NE1 receives the Route Response, it sends the related route result to the CC of the NE1.

The fourth embodiment of the method of the present invention will be described with reference to FIG. 1, FIG. 2, FIG. 4 and FIG. 6, by taking the NE1, the NE2 and the NE3 shown in FIG. 6 as an example, wherein the NE1 has no RC, the NE2 has no complete RDB, and the NE1 needs to implement the function of route inquiry.

The fourth embodiment includes the following steps:

In step 601, the CC of the NE1 shown in FIG. 6 determines whether to query the route, if yes, proceeds to the next step;

In step 602, the CC of the NE1 constructs a protocol message of Route Request and sends the protocol message to NE2 through the PC of the NE1;

In step 603, the PC of the NE2 receives the protocol message of Route Request from the NE1 and forwards the protocol message to the CC of the NE2;

In step 604, the CC of the NE2 sends the Route Request of NE1 to the RC of the NE2 according to the received protocol message, and the RC of the NE2 calls a route algorithm and performs route calculation based on the RDB of the NE2;

In step 605, the RC of the NE2 checks the route result and if the result is that the route inquiry fails and the failure reason is that the RDB of the NE2 is not complete, the RC reconstructs a protocol message of Route Request and sends the protocol message to the NE3 through the PC;

In step 606, the PC of NE3 receives the protocol message of Route Request and forwards the protocol message to the RC of NE3;

In step 607, the RC of the NE3 calls a route algorithm according to the received Route Request and performs route calculation based on the RDB of NE3;

In step 608, the RC of NE3 checks the route result and if the result is that the route inquiry is successful, it constructs a protocol message of Route Response according to the route result and sends the protocol message of Route Response carrying the route result to the direction of the NE1 through the PC, and when the protocol message of Route Response is sent to the NE2, the RC of the NE2 returns the route result to the CC of the NE2, and the CC of the NE2 constructs a protocol message of Route Response according to the route result and sends the protocol message of Route Response carrying the route result to the NE1;

In step 609, after the PC of the NE1 receives the Route Response, it sends the related route result to the CC of the NE1.

In the present invention, if the NE2 receives the request from the NE1 and fails to calculate the route, it returns a failure response of route query if there is no other available NE; otherwise, it continually sends the request to other NEs. If the remote NE2 has no RC, the NE2 can send the request to a next remote NE3; otherwise, a failure response of route calculation is returned.

From the above embodiments, it can be seen that taking a ASON NE having no RC which needs to query route as a starting point, the present invention realizes the route query by one or more remote NEs through the CC of the NE by interacting with the CC or RC of one or more remote NEs with the aid of protocol message, easy and reliable.

Of course, the present invention has many other embodiments. Therefore, without departing from the spirit and essence of the present invention, those skilled in the field can make various changes or modification which should fall into the protection scope of the claims of the present invention.

INDUSTRIAL APPLICABILITY

The present invention offers a route query method in ASON for implementing the route query by a NE which has a protocol controller PC and a connection controller CC but without routing controller RC. The NE1 having no RC sends a protocol message of Route Request to a remote NE2, then the NE2 obtains route result according to the Route Request, and returns the result through a protocol message of Route Response to the NE1 which launches the Route Request; after receiving the protocol message of Route Response, the PC of the NE1 sends the protocol message of Route Response to the CC of the NE1. The method of the present invention realizes route query by one or more remote NEs, with the aid of protocol message and interaction with the CC or RC of the remoter NE. The method is easy and reliable. The present invention can be applied in the fields of data and ASON.

What I claim is:

1. A route query method in an automatic switched optical network (ASON) for realizing the route query of a network element (NE) having a protocol controller (PC) and a connection controller (CC) but without a route controller (RC), comprises the steps:

(1) when the CC of a NE1 without a RC needs to query a route, the NE1 sends a protocol message of Route Request to a remote NE2;
   (2) when the remote NE2 obtains route result according to the Route Request, the remote NE2 returns the route result to the NE1 who launches the Route Request by sending a protocol message of Route Response;
   (3) the PC of the NE1 returns the route result to the CC of the NE1 after it receives the protocol message of Route Response.

2. A method according to claim 1, wherein said step (1) comprises:

when the CC of the NE1 determines that it needs to query the route, the CC constructs the protocol message of Route Request;

the PC of the NE1 sends the protocol message of Route Request to the remote NE2.

3. A method according to claim 1, wherein if the remote NE2 comprises a RC, a PC and a routing database (RDB) with complete route information of the ASON, the step (2) comprises:

the PC of the remote NE2 forwards to the protocol message of Route Request to the RC of the remote NE2 after it receives the protocol message;

according to the Route Request, the RC of the remote NE2 calls the route algorithm, calculates the route based on the RDB of the remote NE2 and constructs the protocol message of Route Response;

the PC of the remote NE2 returns the protocol message of Route Response to the NE1 which launches the Route Request.

4. A method according to claim 3, wherein the step (2) further comprises:

if the RC of the remote NE2 determines that the routing fails and the requested route information is not found after calculating the route, the RC constructs a protocol message of Route Request according to the Route Request and sends the protocol message to a remote NE3 having a RC, a PC and a complete RDB through the PC of the remote NE2;

the PC of the remote NE3 forwards the protocol message of Route Request to the RC of the remote NE3 after it receives the protocol message, according to the Route Request, the RC of the remote NE3 calls the route algorithm and calculates the route based on the RDB of the remote NE3, and constructs the protocol message of Route Response after successfully calculating the route;

the protocol message of Route Response is returned to the remote NE2 and then to NE1 by the PC of the remote NE3 until the CC of the NE1 receives route calculation result.

5. A method according to claim 4, wherein the above route algorithm is Constrained Shortest Path First (CSPF).

6. A method according to claim 3, wherein the above route algorithm is Constrained Shortest Path First (CSPF).

7. A method according to claim 1, characterized in that if the remote NE2 has a RC, a PC, a CC and a RDB having complete route information of the ASON, then step (2) includes:

the PC of the remote NE2 forwards the protocol message of Route Request to the CC of the remote NE2 after it receives the protocol message;

the CC of the remote NE2 sends the Route Request of remote NE2 to the RC of the remote NE2 according to the Route Request;

the RC of the remote NE2 calls the route algorithm, calculates the route based on the RDB of the remote NE2 according to the Route Request sent from the CC of remote NE2, and returns the route result to the CC of the remote NE2;

the CC of the remote NE2 constructs the protocol message of Route Response according to the received route result, and returns the protocol message to the NE1 who launches the Route Request through the PC of the remote NE2.

8. A method according to claim 7, wherein said step (2) further comprises:

if the RC of the remote NE2 determines that the routing fails and the requested route information is not found after it calculates the route, the RC constructs the protocol message of Route Request according to the Route Request and sends the protocol message to the remote NE3 having a RC, a PC and a complete RDB through the PC of the remote NE2;

the PC of the remote NE3 forwards the protocol message of Route Request to the RC of the remote NE3 after it receives the protocol message;

according to the Route Request, the RC of the remote NE3 calls the route algorithm, calculates the route based on the RDB of the remote NE3 and constructs the protocol message of Route Response after successfully calculating the route;

the PC of the remote NE3 returns the protocol message of Route Response to the remote NE2, and the CC of remote NE2 reconstructs the protocol message of Route Response according to the route calculation result, and sends the protocol message to the NE1 until the CC of the NE 1 receives the route calculation result.

9. A method according to claim 8, wherein the above route algorithm is Constrained Shortest Path First (CSPF).

10. A method according to claim 7, wherein the above route algorithm is Constrained Shortest Path First (CSPF).

* * * * *